United States Patent
Knoblauch

(10) Patent No.: US 12,388,327 B2
(45) Date of Patent: Aug. 12, 2025

(54) ELECTRIC MACHINE FOR AN ELECTRIC VEHICLE

(71) Applicant: Dr. Ing. h.c. F. Porsche Aktiengesellschaft, Stuttgart (DE)

(72) Inventor: Daniel Knoblauch, Leonberg (DE)

(73) Assignee: DR. ING. H.C. F. PORSCHE AKTIENGESELLSCHAFT, Stuttgart (DE)

(*) Notice: Subject to any disclaimer, the term of this patent is extended or adjusted under 35 U.S.C. 154(b) by 251 days.

(21) Appl. No.: 18/351,509

(22) Filed: Jul. 13, 2023

(65) Prior Publication Data
US 2024/0022138 A1    Jan. 18, 2024

(30) Foreign Application Priority Data
Jul. 18, 2022   (DE) ................... 10 2022 117 850.1

(51) Int. Cl.
  *H02K 9/197*   (2006.01)
  *H02K 5/20*    (2006.01)

(52) U.S. Cl.
  CPC ............ *H02K 9/197* (2013.01); *H02K 5/203* (2021.01)

(58) Field of Classification Search
  CPC  H02K 9/19; H02K 9/197; H02K 9/00; H02K 5/20; H02K 5/203; H02K 5/02; H02K 5/04; H02K 5/00
  See application file for complete search history.

(56) References Cited

U.S. PATENT DOCUMENTS 4,227,108 A * 10/1980  Washizu ............... H02K 5/128
                                                         310/58
9,130,417 B2 * 9/2015  Bode ..................... H02K 5/128
                              (Continued)

FOREIGN PATENT DOCUMENTS

DE           1802561 A      5/1970
DE           1802561 A1 *   5/1970
DE      202005021025 U1 *   2/2007  ............. H02K 5/08
                              (Continued)

OTHER PUBLICATIONS

Machine Translation of DE 1802561 A1 (Year: 1970).*
Machine Translation of DE_202005021025_U1 (Year: 2006).*

*Primary Examiner* — Alexander A Singh
*Assistant Examiner* — Charlie Frank Mann, Jr.
(74) *Attorney, Agent, or Firm* — LEYDIG, VOIT & MAYER, LTD.

(57) ABSTRACT

An electric machine includes a housing, a stator rigidly arranged on the housing, a rotor rotatably supported on the housing, and a canned tube. The stator and rotor bound a radial gap. The canned tube fluid-tightly abuts the housing such that the canned tube fluid-tightly separates a wet space through which a coolant can flow from a dry space. The stator and rotor are arranged in the wet and dry spaces, respectively. The canned tube on an outer peripheral surface and/or the stator on an inner peripheral surface includes an elastically deformable sealing element. The sealing element is elastically deformed in a finally mounted state of the canned tube between the outer peripheral surface of the canned tube and the inner peripheral surface of the stator such that a gap between the outer peripheral surface and the inner peripheral surface of the stator is sealed.

9 Claims, 1 Drawing Sheet

(56) References Cited

U.S. PATENT DOCUMENTS

2014/0139061 A1* 5/2014 Gutjahr .................. H02K 9/197
                                                            310/86
2021/0218316 A1* 7/2021 Ness ...................... H02K 5/203

FOREIGN PATENT DOCUMENTS

DE      202011103647 U1    10/2012
DE      102020101316 A1     7/2021

* cited by examiner

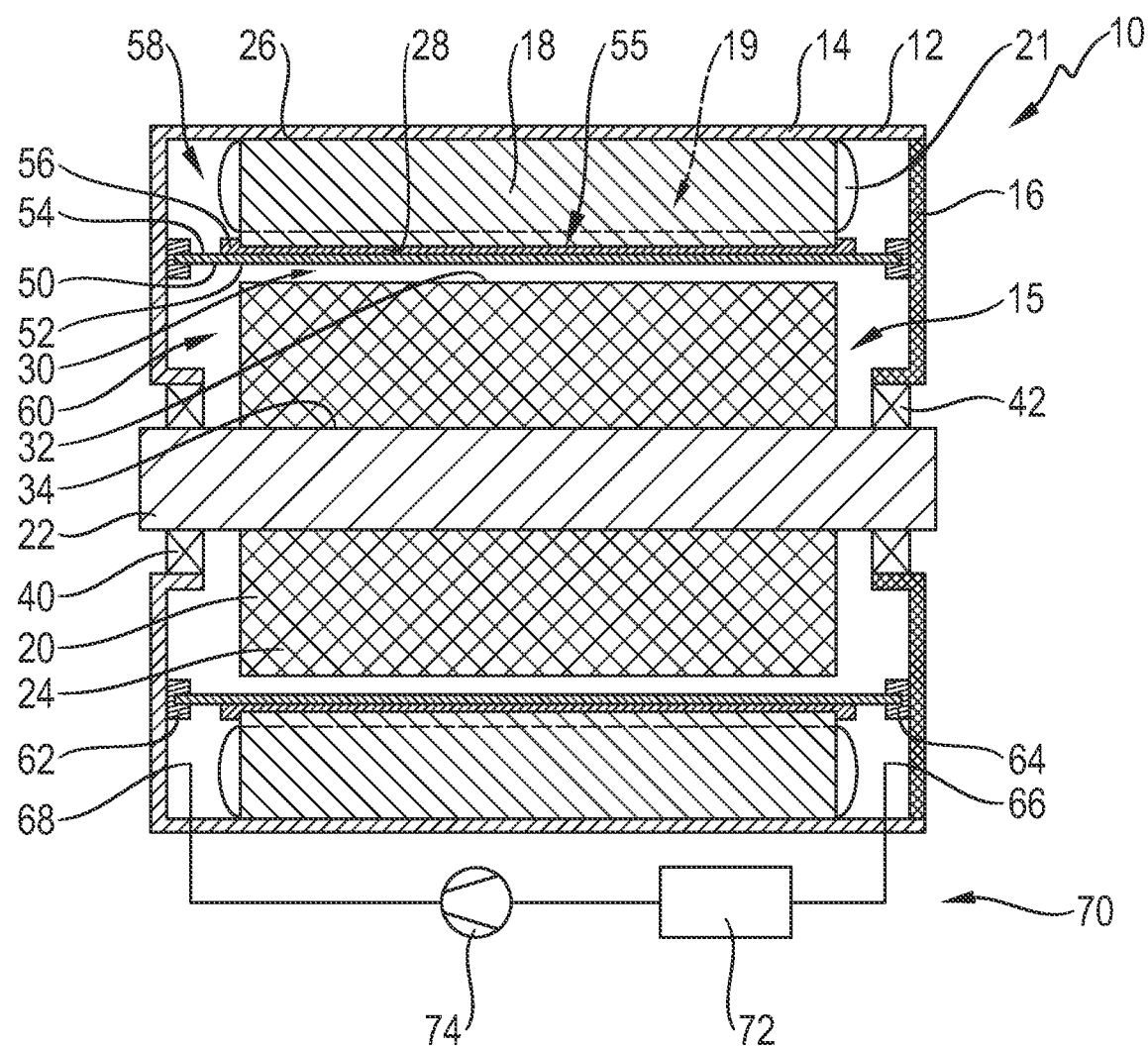

ELECTRIC MACHINE FOR AN ELECTRIC VEHICLE

CROSS REFERENCE TO RELATED APPLICATIONS

This application claims benefit to German Patent Application No. DE 10 2022 117 850.1, filed on Jul. 18, 2022, which is hereby incorporated by reference herein.

FIELD

The invention relates to an electric machine for an electric vehicle, with a housing and a stator rigidly arranged in the housing, and a rotor rotatably supported on the housing.

BACKGROUND

Electric machines, also known as canned motors, are well known. For example, DE 2020 101 316 A1 discloses such an electric machine. The electric machine comprises a rotor having a rotor sheet package and a stator. Furthermore, the electric machine comprises a canned tube made of plastic arranged in a radial gap between an inner peripheral surface of the stator and an outer peripheral surface of the rotor. The canned tube serves to seal a wet space through which a coolant flows from a dry space, wherein the stator is arranged in the wet space and the rotor is arranged in the dry space. In this way, the stator that heats up during operation can be cooled directly by a coolant, wherein the coolant flows around the coil heads on the one hand and around the stator coils extending through the stator grooves on the other hand. The coolant flows through the stator grooves. The canned tube is connected to the stator via the outer peripheral surface. For this purpose, a resin coating, which is also used for sealing between the stacked stator sheets, is provided on the outer peripheral surface of the canned tube, wherein the canned tube is mounted on the stator and a material-locking connection is established via the resin coating between the outer peripheral surface of the canned tube and the inner peripheral surface of the stator. This fluid-tightly seals the gap between the inner peripheral surface of the stator and the outer peripheral surface of the canned tube. Alternatively, the canned tube can be attached to the stator via a press-fit or an adhesive connection, i.e., via a material-locking connection. Such an embodiment is disclosed, for example, by DE 20 2005 021 025 U1.

One disadvantage of a press-fit between the outer peripheral surface of the canned tube and the inner peripheral surface of the stator is that a fluid-tight connection between the outer peripheral surface of the canned tube and the inner peripheral surface cannot be reliably prevented. In the operation of the electric machine, temperature fluctuations occur, thereby causing thermal expansions of the components, in particular of the canned tube and the stator, wherein the thermal expansion of the canned tube deviates relatively strongly from the thermal expansion of the stator, i.e., the stator sheet package, due to the material deviating from the stator, and the pressing between the outer peripheral surface of the canned tube and the inner peripheral surface can thereby be reduced in such a way that leakage through the gap between the stator and the canned tube cannot be reliably prevented. In addition, the coolant is introduced into the wet space at a certain pressure, so that the coolant is also present in the region of the abutment between the canned tube and the stator in case of pressure, thereby pushing the coolant into the gap.

The material-locking connection of the canned tube to the stator, in particular by the resin coating or the glue, leads to an undesirable mechanical stress on the canned tube. The mechanical stress is caused by the deviating thermal expansions of different components of the electric machine. The canned tube is attached to the stator on the one hand in a material-locking manner and on the other hand to a housing in a fluid-tight manner at both axial ends. In the event of temperature fluctuations in the operation of the electric machine, the canned tube and the different components abutting the canned tube, in particular the stator sheet package and the housing, expand in deviation from one other, thereby mechanically stressing the canned tube attached to both components.

SUMMARY

In an embodiment, the present disclosure provides an electric machine for an electric vehicle, comprising a housing, a stator rigidly arranged on the housing, a rotor rotatably supported on the housing, and a canned tube. The stator and the rotor bound a radial gap. The canned tube fluid-tightly abuts the housing at an end such that the canned tube fluid-tightly separates a wet space through which a coolant can flow from a dry space. The stator is arranged in the wet space and the rotor is arranged in the dry space. The canned tube on an outer peripheral surface and/or the stator on an inner peripheral surface comprises an elastically deformable sealing element. The sealing element is elastically deformed in a finally mounted state of the canned tube between the outer peripheral surface of the canned tube and the inner peripheral surface of the stator such that a gap between the outer peripheral surface of the canned tube and the inner peripheral surface of the stator is sealed.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1 schematically shows an electric machine of an electric vehicle in cross-section.

DETAILED DESCRIPTION

In an embodiment, the present invention provides an electric machine by which the gap between the stator and the canned tube can be reliably sealed and the mechanical stress of the canned tube can be reduced.

In an embodiment, an electric machine for an electric vehicle is provided with a housing, a stator rigidly arranged on the housing, a rotor rotatably supported on the housing, wherein the stator and the rotor bound a radial gap, and a canned tube arranged in the radial gap and fluid-tightly abutting the housing at the end in such a way that the canned tube fluid-tightly separates a wet space through which a coolant can flow from a dry space, and wherein the stator is arranged in the wet space and the rotor is arranged in the dry space.

Due to the fact that the canned tube on an outer peripheral surface and/or the stator on an inner peripheral surface comprises an elastically deformable sealing element, wherein the sealing element is elastically deformed in the finally mounted state of the canned tube between the outer peripheral surface of the canned tube and the inner peripheral surface of the stator in such a way that a gap between the outer peripheral surface of the canned tube and the inner peripheral surface of the stator is sealed in a fluid-tight manner, the gap between the outer peripheral surface of the canned tube and the inner peripheral surface of the stator can be reliably sealed by the elastically deformed sealing element, on the one hand, and the thermal expansions of different components occurring during operation of the electric machine can be permitted by the flexibility of the sealing element and/or a displacement of the canned tube, on the other hand. The displacement of the canned tube is possible, because the sealing element does not form a material-locking connection between the canned tube and the stator.

Preferably, the sealing element is configured as a coating, wherein the coating is applied to the outer peripheral surface of the canned tube and/or to the inner peripheral surface of the stator. The coating can be applied during the manufacture of the stator and/or the canned tube, wherein the canned tube need only be inserted into an opening radially bounded by the inner peripheral surface during final assembly of the electric machine. The sealing element thereby deforms when the canned tube is inserted into the opening. In this way, assembly can be simplified.

In a preferred configuration, the sealing element is made of an elastomer, wherein the elastomer can conform to the corresponding abutment surface, and thereby the gap between the outer peripheral surface of the canned tube and the inner peripheral surface of the stator can be reliably sealed. In addition, the elastomer is flexible such that the thermal expansions created during operation can be accommodated by the elastic deformation of the sealing element.

Preferably, the wet space on a first end face of the stator comprises a coolant inlet and on a second end face comprises a coolant outlet, wherein the sealing element is provided exclusively on a portion of the outer peripheral surface of the canned tube facing the coolant inlet and/or the inner peripheral surface of the stator. As a result, manufacturing costs can be reduced, and sealing of the gap between the outer peripheral surface of the canned tube and the inner peripheral surface of the stator can continue to occur in a reliable manner. A pressure-based penetration into the gap can thereby be prevented.

In a preferred configuration, the sealing element extends over the entire abutment portion between the canned tube and the stator. Thus, the gap between the outer peripheral surface of the canned tube and the inner peripheral surface of the stator can be particularly reliably sealed. In an embodiment, the sealing element extends axially beyond the abutment portion between the canned tube and the stator, wherein a collar is formed in the deformed state of the sealing element in the region outside the abutment portion, i.e., in the non-deformed region. This further improves the sealing.

Preferably, the canned tube is made of a fiber-reinforced plastic, in particular a fiber glass-reinforced plastic. The canned tube can thus be manufactured with a low weight. In addition, the canned tube can be manufactured simply and in a time-saving manner.

In a preferred embodiment, the stator comprises a plurality of stator grooves distributed circumferentially, in which at least one stator coil is arranged, wherein the stator grooves are configured so as to be closed at the inner peripheral surface. By means of the closed stator grooves, a radial stress of the canned tube can be prevented by the coolant flowing in the stator grooves, so that the canned tube is subjected to less mechanical stress and the wall thickness can thereby be designed smaller. The reduced wall thickness can reduce the radial extension of the radial gap, thereby increasing the efficiency of the electric machine.

Preferably, the canned tube abuts the housing on the end side via a respective seal, whereby the dry space can be reliably sealed against the wet space.

An electric machine is thus provided, in which, on the one hand, the gap between the outer peripheral surface of the canned tube and the inner peripheral surface of the stator can be reliably sealed by the elastically deformable sealing element and, on the other hand, the stresses of the canned tube caused by the thermal expansions can be reduced.

An exemplary embodiment of the invention will now be explained in further detail with reference to the drawing.

FIG. 1 shows an electric machine 10 of an electric vehicle, which is used in particular as a traction machine of an electric vehicle. The electric machine 10 comprises a housing 12, which comprises a housing base body 14 and a lid 16 and bounds a housing interior 15. A stator 18 and a rotor 20 are arranged in the housing 12, i.e., in the housing interior 15. The stator 18 is fixed to the housing 12 over the outer peripheral surface 26, i.e., to a housing wall of the housing base body 14, via the outer peripheral surface and is thus rigidly arranged in the housing interior The stator 18 comprises a plurality of stator grooves 19 distributed circumferentially, in which a stator coil 21 is arranged. The stator grooves 19 extend between the two end faces of the stator 18, wherein the stator grooves 19 are closed at an inner peripheral surface 28 of the stator 18. The inner peripheral surface 28 of the stator 18 bounds a through-opening in which the rotor is arranged. The rotor 20 comprises a rotor shaft 22 and a rotor core 24, wherein the rotor core 24 is in particular configured as a rotor sheet package and comprises a plurality of embedded permanent magnets. The rotor shaft 22 is rotatably supported on the housing 12, wherein a respective bearing element 40, 42 is arranged on both axial ends of the rotor shaft 22. The rotor core 24 is attached to a peripheral surface of the rotor shaft 22 and rotates along with the rotor shaft 22.

The electric machine 10 further comprises a canned tube 50 arranged in a radial gap between the stator 18 and the rotor 20. The radial gap 30 is thereby radially bounded by the inner peripheral surface 28 of the stator 18 and an outer peripheral surface 32 of the rotor 20. The canned tube 50 is made of a fiber composite, in particular a fiber glass-reinforced plastic, and extends through the radial gap 30, wherein the canned tube 50 projects beyond the front faces of the stator 18 and is fixed to the housing 12 in the axial direction on both sides in a fluid-tight manner. The canned tube 50 has an outer peripheral surface 54 facing the stator 18 and an inner peripheral surface 52 facing the rotor 20. A seal 62, 64 is arranged on two opposite sides of the housing 12 in order to fluid-tightly connect the canned tube 50 to the housing 12. Thus, the canned tube 50 divides the housing interior 15 into a wet space 58 and a dry space 60. The stator 18 is arranged in the wet space 58. The rotor 20 is arranged in the dry space 60.

In addition to the end-sided attachment of the canned tube 50 to the housing 12, the canned tube 50 is radially supported on the stator 18, wherein the canned tube 50 is supported with an outer peripheral surface 54 on the inner peripheral surface 28 of the stator 18. The canned tube 50 has a sealing element 56 on the outer peripheral surface 54 of the canned tube 50, which is manufactured from an elastomer and is applied to the outer peripheral surface 54 of the canned tube 50 via a coating process.

During operation of the electric machine 10, the stator 18, in particular the stator coils 21, heat up. In order to cool, i.e., to remove heat from the stator 18 or stator coils 21, the wet space 58 has a coolant inlet 68 and a coolant outlet 66, wherein the coolant inlet 68 is arranged at a first end face of the stator 18 and the coolant outlet 66 is arranged at a second end face of the stator 18. The coolant inlet 68 and the coolant outlet 66 are fluid-tightly connected to a cooling system 70. The cooling system 70 comprises a heat exchanger 72 and a pump 74. A coolant is pumped through the pump 74 to the coolant inlet 68 and thus into the wet space 58. The coolant then flows through the stator grooves 19 from the first end face of the stator 18 to the second end face of the stator 18. Finally, the coolant flows out of the wet space 58 via the coolant outlet 66 and flows to the heat exchanger 72, where the heat received from the coolant is dissipated.

It is essential that the coolant for cooling the stator coil 21 flows exclusively through the stator grooves 19, and a leakage at other points is avoided. In particular, the coolant should not flow via the gap 55 between the inner peripheral surface 28 of the stator 18 and the outer peripheral surface 54 of the canned tube 50 from the first end face to the second end face of the stator 18, i.e., a penetration of the coolant into the gap 55 should be avoided as much as possible. This is achieved by the sealing element 56, which is attached to the canned tube 50 in a fluid-tight manner, wherein the sealing element 56 is applied to the outer peripheral surface 54 of the canned tube 50 in the form of a coating and, in the finally assembled state, abuts the inner peripheral surface 28 of the stator 18 in an elastically deformed manner. The sealing element 56 is provided over the entire abutment surface between the stator 18 and the canned tube 50 and even projects axially beyond the abutment surface.

It is further critical that the stress on the canned tube 50 caused by the temperature fluctuations during operation of the electric machine 10 or by the thermal expansions of the rotor core 24 and the housing 12 caused by the temperature variations is kept as low as possible. This is achieved by the fact that the canned tube 50 is not connected to the stator 18 in a material-locking manner and the elastically deformable sealing element 56 can accommodate the thermal expansions or allow a displacement of the canned tube 50.

In addition or alternatively, a sealing element could also be provided on the inner peripheral surface 28 of the stator 18. Furthermore, the sealing element could also only be provided on a portion abutting the first end face so that the gap 55 is only sealed on the coolant inlet side.

Structural embodiments other than the described embodiments are possible as well. For example, the canned tube 50 could also be made of a carbon fiber-reinforced plastic. In addition, the sealing element 56 could also be made of a different material and/or glued to the canned tube 50.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An electric machine for an electric vehicle, comprising:
a housing;
a stator rigidly arranged on the housing;
a rotor rotatably supported on the housing, wherein the stator and the rotor bound a radial gap; and
a canned tube arranged in the radial gap and fluid-tightly abutting the housing at an end such that the canned tube fluid-tightly separates a wet space through which a coolant can flow from a dry space,
wherein the stator is arranged in the wet space and the rotor is arranged in the dry space,
wherein the canned tube on an outer peripheral surface and/or the stator on an inner peripheral surface comprises an elastically deformable sealing element,
wherein the sealing element is elastically deformed in a finally mounted state of the canned tube between the outer peripheral surface of the canned tube and the inner peripheral surface of the stator such that a gap between the outer peripheral surface of the canned tube and the inner peripheral surface of the stator is sealed.

2. The electric machine according to claim 1, wherein there is no material-locking connection between the canned tube and the stator.

3. The electric machine according to claim 1, wherein the sealing element is configured as a coating, and
wherein the coating is applied to the outer peripheral surface of the canned tube and/or to the inner peripheral surface of the stator.

4. The electric machine according to claim 1, wherein the sealing element is made from an elastomer.

5. The electric machine according to claim 1, wherein the wet space on a first end face of the stator comprises a coolant inlet and on a second end face of the stator comprises a coolant outlet, and
wherein the sealing element is provided exclusively on a portion of the outer peripheral surface of the canned tube facing the coolant inlet and/or the inner peripheral surface of the stator.

6. The electric machine according to claim 1, wherein the sealing element extends across an entire abutment portion between the canned tube and the stator.

7. The electric machine according to claim 1, wherein the canned tube is manufactured from a fiber-reinforced plastic.

8. The electric machine according to claim 1, wherein the stator comprises a plurality of stator grooves distributed circumferentially, in which at least one stator coil is arranged, and
wherein the stator grooves are configured to be closed at the inner peripheral surface.

9. The electric machine according to claim 1, wherein the canned tube abuts the housing on an end side via a respective seal.

* * * * *